(12) United States Patent
Hsu et al.

(10) Patent No.: US 8,085,245 B2
(45) Date of Patent: Dec. 27, 2011

(54) DISPLAY DEVICE, KEYPAD THEREOF AND METHOD FOR ACTIVATING DISPLAY DEVICE

(75) Inventors: Mao-Shan Hsu, Taoyuan County (TW); Yi-Hsiang Huans, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 764 days.

(21) Appl. No.: 11/324,396

(22) Filed: Jan. 3, 2006

(65) Prior Publication Data
US 2007/0080941 A1   Apr. 12, 2007

(30) Foreign Application Priority Data
Oct. 11, 2005   (TW) .............................. 94135379 A

(51) Int. Cl.
*G09G 5/00* (2006.01)
(52) U.S. Cl. ........ 345/169; 345/160; 345/168; 345/204; 713/192; 713/193; 700/83; 700/84; 353/30
(58) Field of Classification Search .................. 345/160, 345/204, 168, 169; 713/192, 193; 700/83, 700/84; 353/29–30
See application file for complete search history.

(56) References Cited

U.S. PATENT DOCUMENTS

| | | | |
|---|---|---|---|
| 4,497,038 A | | 1/1985 | Diepold-Scharnitzky et al. |
| 5,299,265 A | * | 3/1994 | Hayama et al. .................. 381/86 |
| 5,349,326 A | * | 9/1994 | Yamada .................... 340/426.34 |
| 5,359,230 A | * | 10/1994 | Namiki et al. ................ 307/10.1 |
| 5,420,925 A | * | 5/1995 | Michaels ....................... 380/262 |
| 5,619,515 A | * | 4/1997 | Hayama ........................ 714/799 |
| 5,619,575 A | * | 4/1997 | Koopman et al. ................. 380/28 |
| 5,637,928 A | * | 6/1997 | Nakajima et al. ............. 307/10.2 |
| 5,649,014 A | * | 7/1997 | Koopman et al. ................. 380/28 |
| RE36,181 E | * | 4/1999 | Koopman et al. .............. 713/168 |
| 6,067,028 A | * | 5/2000 | Takamatsu ..................... 340/5.8 |
| 6,131,051 A | * | 10/2000 | Beckert et al. ................... 700/83 |
| 6,783,252 B1 | * | 8/2004 | Cambron ....................... 353/122 |
| 6,935,754 B2 | * | 8/2005 | Salvatori et al. .............. 353/119 |
| 6,984,045 B2 | * | 1/2006 | Cambron ....................... 353/122 |
| 7,121,670 B2 | * | 10/2006 | Salvatori et al. .............. 353/119 |
| 2003/0038880 A1 | * | 2/2003 | No .............................. 348/207.1 |
| 2004/0168071 A1 | * | 8/2004 | Silverbrook .................. 713/189 |
| 2007/0008307 A1 | * | 1/2007 | Lokkeberg et al. ........... 345/204 |

FOREIGN PATENT DOCUMENTS

WO    WO 2004/077371 A1    9/2004

* cited by examiner

*Primary Examiner* — Lun-Yi Lao
*Assistant Examiner* — Gregory J Tryder
(74) *Attorney, Agent, or Firm* — Patterson Thuente Christensen Pedersen, P.A.

(57) ABSTRACT

A display device includes a processor, a memory, an interface and a keypad. The keypad, separably connected to the interface, includes a signal generator. When the display device is connected to a power source, the processor sends a first signal to the interface. The signal generator generates a second signal in response to the first signal. The processor determines whether the second signal is correct based on data stored in the memory. If yes, the display device may be activated. A method for activating the display device via the separable keypad comprises the steps of: connecting the display device to the power source; the display device sending the first signal to the interface; determining whether the second signal is correct; and if yes, activating the display device.

9 Claims, 5 Drawing Sheets

DISPLAY DEVICE, KEYPAD THEREOF AND METHOD FOR ACTIVATING DISPLAY DEVICE

CROSS-REFERENCES TO RELATED APPLICATIONS

This application claims priority to Taiwan Patent Application No. 094135379 filed on Oct. 11, 2005.

BACKGROUND OF THE INVENTION

1. Field of the Invention

The present invention relates to a display device, keypad thereof and method for activating a display device; more specifically, relates to a display device and a method for activating the display device by using a separable keypad.

2. Descriptions of the Related Art

The types of the display devices on the market are very various. A projector, for example, has high risk of being stolen because it is quite valuable and easily exposed to the public. In order to prevent the projector from being stolen, projector manufacturers install king locks to lock the projector. However, because these king locks can be easily destroyed, the burglarproof effect is unsatisfactory.

In conclusion, the existing technology for preventing the display device from being stolen often faces problems, given that the burglarproof structure can be easily destroyed. Therefore, there is still a need for finding ways to protect display devices from being stolen.

SUMMARY OF THE INVENTION

An object of the present invention is to provide a display device comprising a processor, a memory, an interface and a keypad. The memory stores a first data. The keypad, separably connected to the interface, comprises a signal generator. When the display device is connected to a power source, the processor sends a first signal to the interface. The signal generator generates a second signal in response to the first signal. The processor determines whether the second signal is correct according to the first data. If yes, the display device may be activated.

Another object of the present invention is to provide the aforementioned keypad. The keypad, separably connected to a display device, comprises an interface and a signal generator, wherein the interface is configured to connect to the display device and the signal generator is connected to the interface. When the display device is connected to a power source, the display device sends a first signal to the interface. The signal generator generates a second signal in response to the first signal. The second signal is sent to the display device by the interface. The display device determines whether to be activated according to the second signal. If the keypad is not connected to the display device, the display device cannot be activated.

Another object of the present invention is to provide a method for activating a display device by using a separable keypad. The display device comprises an interface and a power button. The interface is connected to a keypad separably. The display device stores a first data. The method comprises the following steps: connecting the display device to a power source; the display device sending a first signal to the interface; determining whether a second signal received from the keypad via the interface is correct according to the first data; and if yes, waiting for the power button being pressed to activate the display device.

Accordingly, when users do not use a display device any more, the keypad of the present invention may be taken away. Even a burglar steals the display device, the display device cannot be activated. Such idea deters a burglar from stealing the display device of the present invention and also avoids that a lock, e.g., a king lock is easily destroyed.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
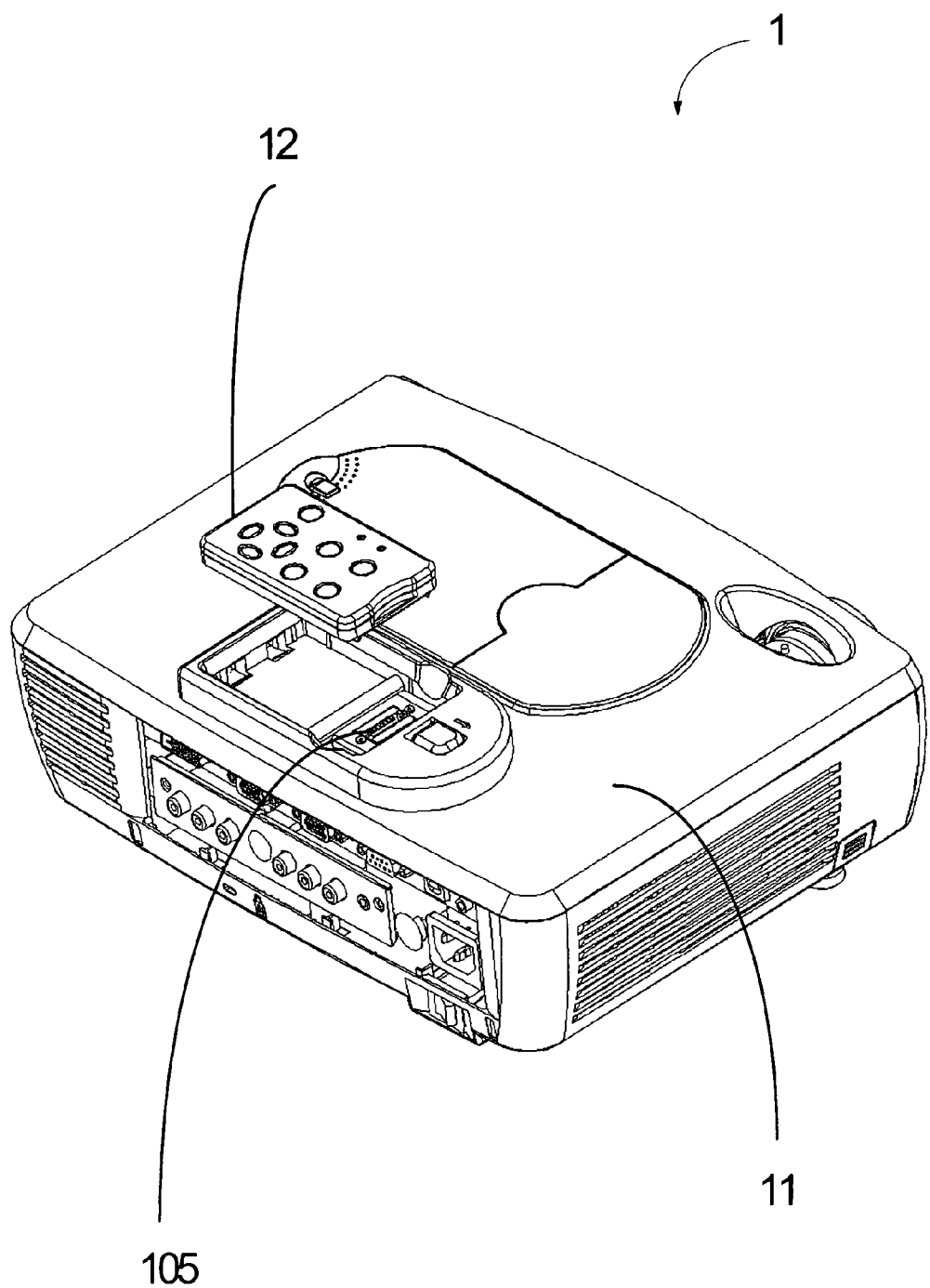
FIG. 1 is a perspective view of a first embodiment of the present invention.
Figure 2:
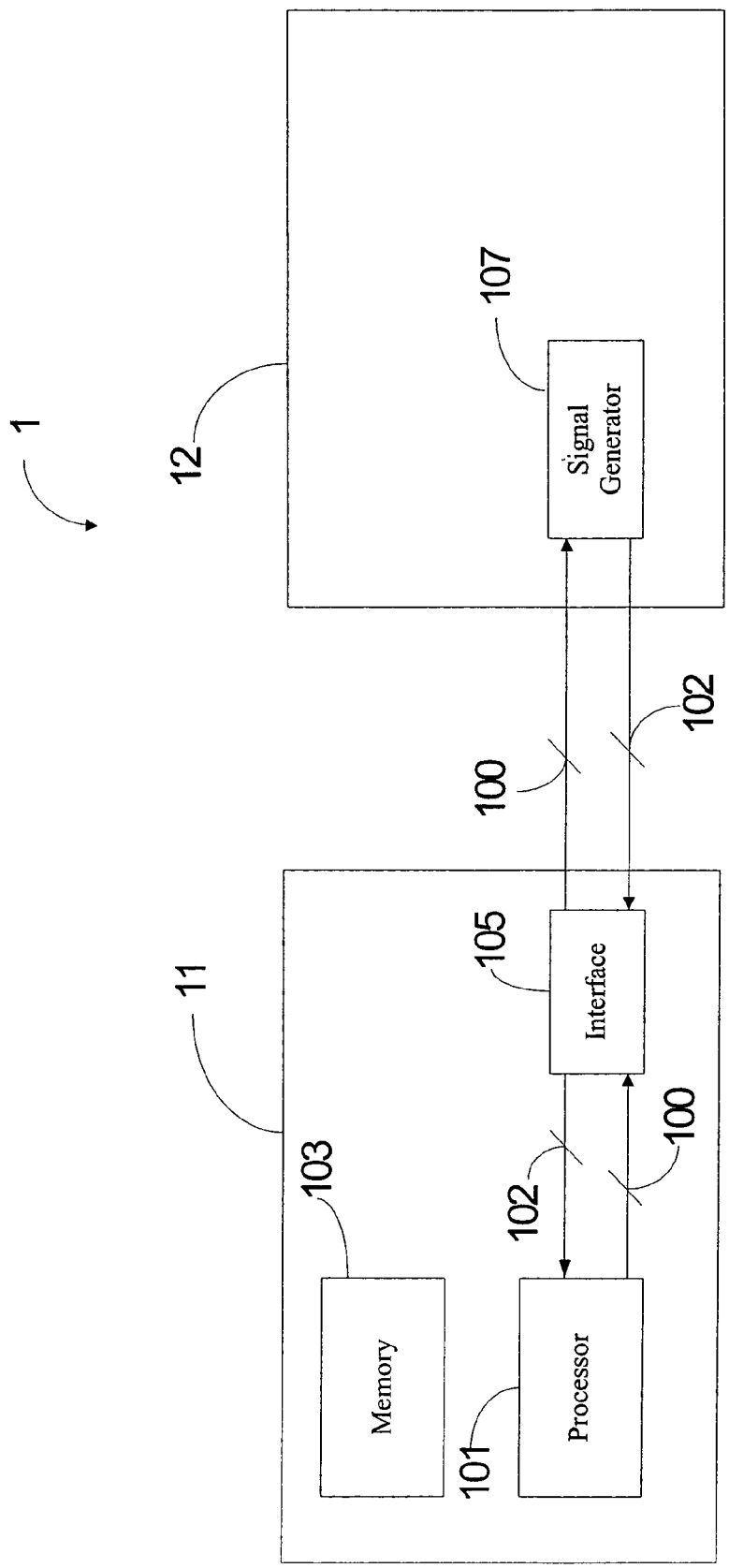
FIG. 2 is a block diagram of the first embodiment of the present invention.

A first embodiment of the present invention is a projection display apparatus 1 as illustrated in FIG. 1 and FIG. 2. The projection display apparatus 1 comprises a mainframe 11 and a separable keypad 12. The mainframe 11 comprises a processor 101, a memory 103 and an interface 105. When the projection display apparatus 1 is connected to a power source, the processor 101 generates a first signal 100 that is a digital signal comprising a plurality of bits. The interface 105 is configured to connect to the separable keypad 12. The keypad 12 comprises a signal generator 107 that generates a second signal 102 in response to the first signal 100. The memory 103 stores a first data. When the processor 101 receives the second signal 102 via the interface 105, the processor 101 determines whether the second signal 102 is correct according to the first data. If yes, the projection display apparatus 1 may be activated and then operates normally.

Figure 3:
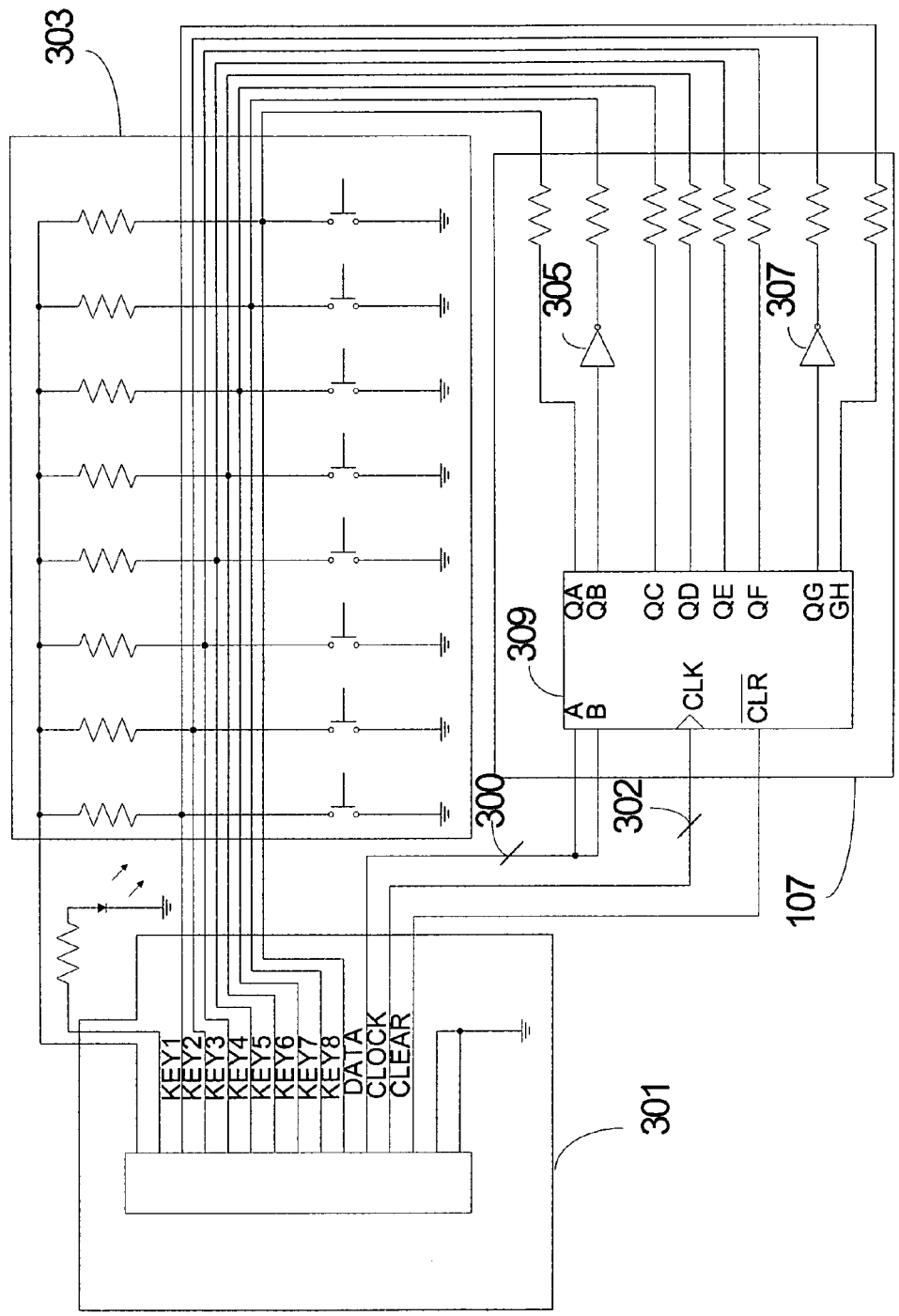
FIG. 3 is a block diagram of an example of a keypad of the present invention.

One example of the keypad 12 is illustrated in FIG. 3. The keypad 12 comprises an interface 301, a key scanning circuit 303 and a signal generator 107. The interface 301, connected to the interface 105 of the mainframe 11, comprises eight signal terminals KEY1~KEY8, a decoding control terminal DATA, a clock terminal CLOCK, and a clear terminal CLEAR. The key scanning circuit 303 comprises a plurality of buttons. When the interface 301 is connected to the interface 105 and the projection display apparatus 1 operates normally, the key scanning circuit 303 generates a voltage once one button of the key scanning circuit 303 is pressed. The voltage is sent to the interface 105 via a corresponding terminal of the eight signal terminals KEY1~KEY8 in order to control the projection display apparatus 1. The signal generator 107 comprises a shift register 309 of type 74164 and inverters 305 and 307 both of which are electrically connected to the buttons of the key scanning circuit 303. The decoding control terminal DATA is configured to input a decoding control signal 300. The clock terminal CLOCK is configured to input a clock signal 302.

More specifically, the above-mentioned first signal 100 is the decoding control signal 300 illustrated in FIG. 3, which is inputted to the signal generator 107 via the decoding control terminal DATA. The decoding control signal 300 successively sends a signal [1], a signal [0], a signal [1], a signal [1], a signal [1], a signal [1], a signal [0] and a signal [1] at the rising edges of the clock signal 302. The signal generator 107 shifts and outputs the bits to output terminals QH, QG; QF, QE, QD, QC, QB and QA after receiving them. As FIG. 3 shows, the output terminal QB is connected to the inverter 305 and the output terminal QG is connected to the inverter 307. These bits form the second signal 102. For example, in response to the first signal 100, from the eight signal terminals KEY1~KEY8 a logic signal [0 1 0 0 0 0 1 1] may be read at the first rising edge of the clock signal 302, a logic signal [0 1 0 0 0 0 0 0] may be read at the second rising edge of the clock signal 302, a logic signal [0 1 0 0 0 1 1 1] may be read at the third rising edge of the clock signal 302, a logic signal [0 1 0 0 1 0 0 1] may be read at the fourth rising edge of the clock signal 302, a logic signal [0 1 0 1 0 1 0 1] may be read at the fifth rising edge of the clock signal 302, a logic signal [0 1 1 0 1 1 0 1] may be read at the sixth rising edge of the clock signal 302, a logic signal [0 0 0 1 1 1 0 0] may be read at the seventh rising edge of the clock signal 302, and a logic signal [1 1 1 1 1 1 1 1] may be read at the eighth rising edge of the clock signal 302.

The projection display apparatus 1 determines whether the received second signal 102 is correct at every rising edge of the clock signal 302 according to the first data stored in the memory 103. If all of the received second signals 102 in the successive eight clocks are correct, the projection display apparatus 1 may be activated normally. Otherwise, the projection display apparatus 1 cannot be activated.

Figure 4:
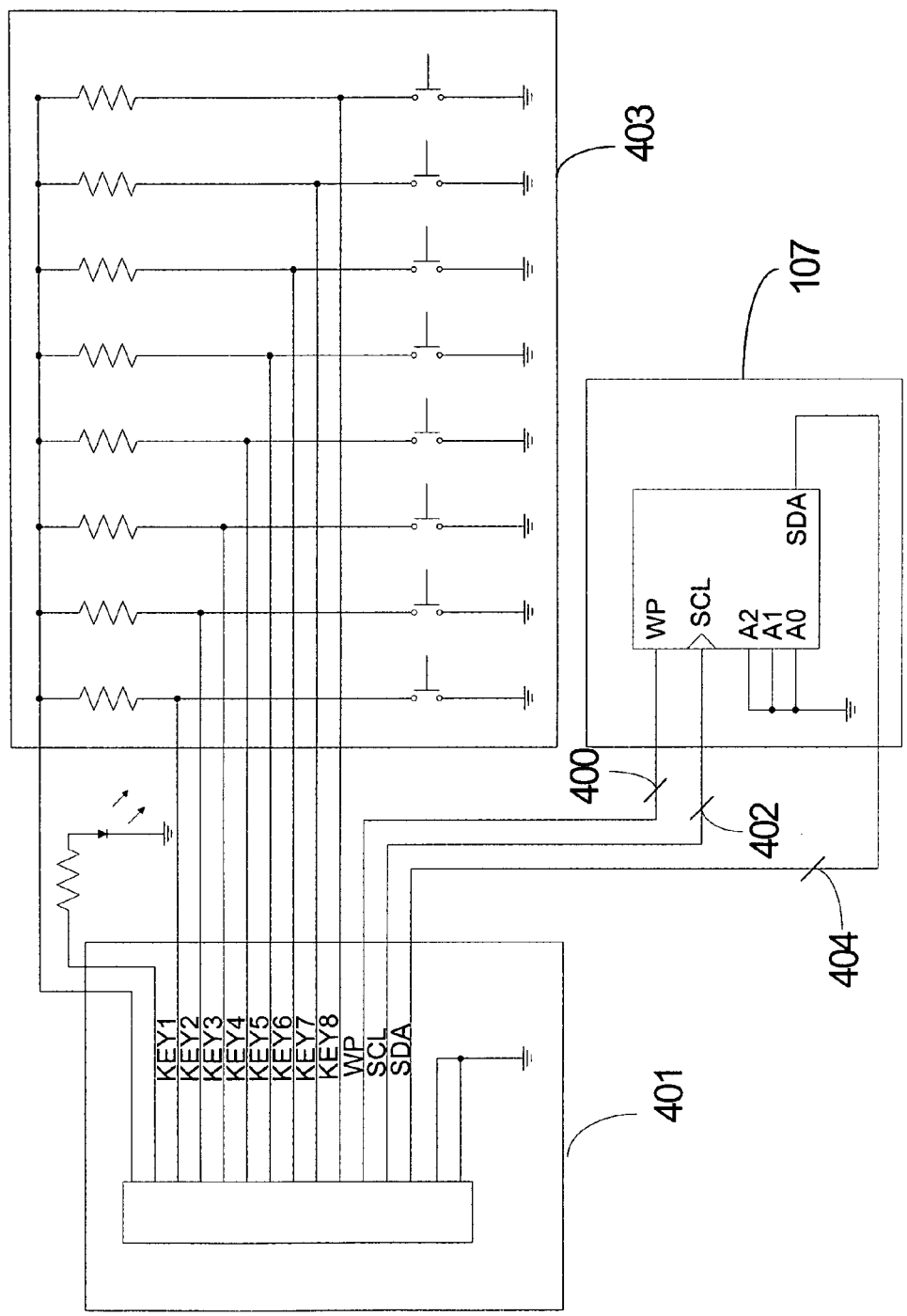
FIG. 4 is a block diagram of another example of a keypad of the present invention.

Another example of the keypad 12 is illustrated in FIG. 4. The keypad 12 comprises an interface 401, a key scanning circuit 403 and a signal generator 107. The interface 401, connected to the interface 105 of the mainframe 11, comprises eight signal terminals KEY1~KEY8 and decoding control terminals WP, SCL, and SDA. The signal generator 107 is an electrically erasable programmable read only memory (EEPROM) of type 24C02 which stores a second data. When the interface 401 is connected to the interface 105, the projection display apparatus 1 sends the first signal 100 to the keypad 12. In this example, the first signal 100 includes a first decoding control signal 400, a second decoding control signal 402 and a third decoding control signal 404. When the first decoding control signal 400, the second decoding control signal 402, the third decoding control signal 404 are inputted to the signal generator 107 via the decoding control terminals WP, SCL, and SDA respectively, the signal generator 107 generates the second signal 102 in response to the first decoding control signal 400, the second decoding control signal 402 and the third decoding control signal 404.

More specifically, the signal generator 107 outputs the second data via the decoding control terminal SDA, which is a bi-directional I/O terminal, to generate the second signal 102. The processor 101 compares the second signal 102 with the first data stored in the memory 103 after receiving the second signal 102. If the second signal 102 is identical to the first data, the projection display apparatus 1 may be activated normally. Otherwise, the projection display apparatus 1 cannot be activated.

Figure 5:
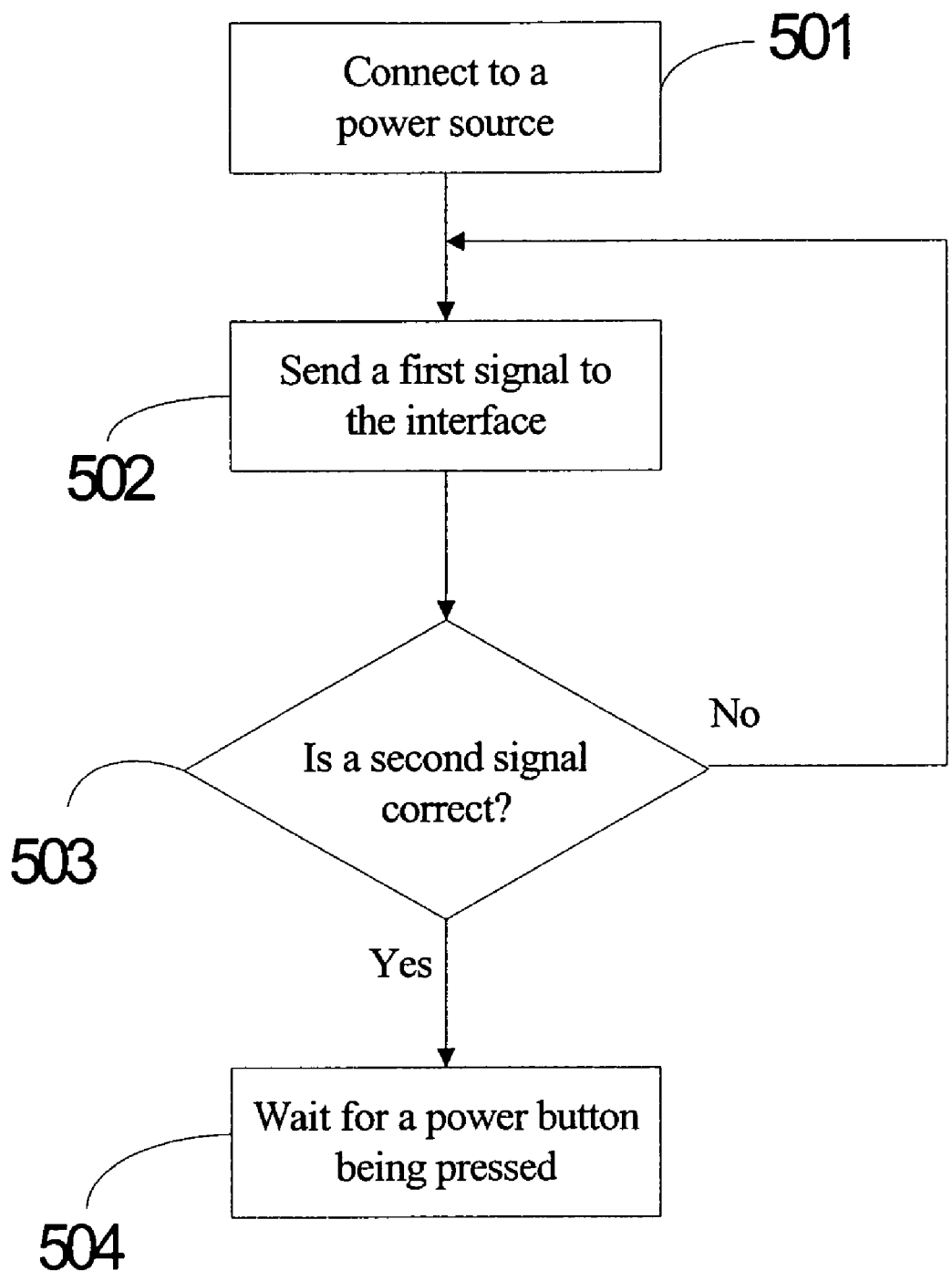
FIG. 5 is a flow chart of a second embodiment of the present invention.

A second embodiment of the present invention is a method for activating a display device. The display device is a projection display apparatus comprising an interface and a power button, wherein the interface is separably connected to a keypad. The projection display apparatus stores a first data. As shown in FIG. 5, the second embodiment comprises the following steps. When step 501 is executed, the projection display apparatus is connected to a power source. Then step 502 is executed, in which the projection display apparatus sends a first signal to the interface. The keypad sends a second signal to the projection display apparatus in response to the first signal. Then step 503 is executed, in which the projection display apparatus determines whether the second signal is correct according to the first data. If yes, that means the projection display apparatus is allowed to be activated so step 504 is executed to wait for the power button being pressed to activate the projection display apparatus. If not, the second embodiment goes back to step 502, in which the projection display apparatus continuously sends the first signal to the interface.

The examples of the keypad in the first embodiment may be applied to the second embodiment. In other words, the keypad in the second embodiment may be the examples illustrated in FIG. 3 or FIG. 4, i.e., the keypad comprises a shift register or an EEPROM. If the keypad comprises the EEPROM, the projection display apparatus determines whether the first data is identical to the second data when step 503 is executed. If yes, step 504 is executed.

Based on the above description, the display device in accordance with the present invention determines whether the display device may be activated normally according to a signal from the keypad. For a burglarproof purpose, users may take the keypad away when the display device is not used. The display device hence cannot be activated normally. Such idea deters a burglar from stealing the display device and also avoids that a lock, e.g., a king lock is easily destroyed.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A display device, comprising:
  a processor;
  a memory for storing a first data;
  an interface, the processor sending a first signal to the interface; and
  a keypad, separably connected to the interface, comprising a signal generator having a shift register for generating a second signal;
  wherein when the display device is connected to a power source each time, the signal generator generates a plurality of logic signals by regularly shifting the first signal to form the second signal, the logic signals not being stored in the memory, the processor determines whether the second signal is correct based on the first data, and if yes, the display device is activated; and
  wherein the display device is a projection display apparatus.

2. The display device as claimed in claim 1, wherein the first signal is a digital signal comprising a plurality of bits.

3. The display device as claimed in claim 2, wherein the keypad further comprises a plurality of buttons, when the keypad is connected to the interface, the keypad sends a voltage to the interface by pressing one of the buttons, the signal generator is electrically connected to the buttons, the shift register generates a plurality of voltages forming one of the logic signals by regularly shifting the first signal.

4. A keypad, separably connected to a display device, comprising:

an interface for connecting to the display device, the interface receiving a first signal from the display device;

a signal generator, connected to the interface, having a shift register for generating a second signal;

wherein when the display device is connected to a power source each time, the signal generator generates a plurality of logic signals by regularly shifting the first signal to form the second signal, the logic signals not being stored in the display device, the second signal is sent to the display device by the interface, and the display device determines whether to be activated according to the second signal; and wherein the display device is a projection display apparatus.

5. The keypad as claimed in claim 4, further comprising a plurality of buttons, wherein the keypad sends a voltage to the display device by pressing one of the buttons when the keypad is connected to the display device, the signal generator is electrically connected to the buttons, and the shift register generates a plurality of voltages forming one of the logic signals by regularly shifting the first signal.

6. A method for activating a display device, the display device comprising an interface and a power button, the interface being separably connected to a keypad, the display device storing a first data, the keypad comprising a shift register, the method comprising the steps of:

(a) connecting the display device to a power source;
(b) the display device sending a first signal to the interface;
(c) determining whether a second signal received from the shift register via the interface is correct according to the first data, if yes, going to step (d); and
(d) waiting for the power button being pressed to activate the display device;

wherein a plurality of logic signals is generated by regularly shifting the first signal to form the second signal, when the display device is connected to the power source each time, and the logic signals are not stored in the display device; and wherein the display device is a projection display apparatus.

7. The method as claimed in claim 6, wherein if the second signal is determined incorrect in step (c), the method goes back to step (b).

8. The method as claimed in claim 6, wherein the first signal is a digital signal comprising a plurality of bits.

9. The method as claimed in claim 8, wherein the keypad comprises:

a plurality of buttons, electrically connected to the shift register, when the keypad is connected to the interface, the keypad sending a voltage to the interface by pressing one of the buttons;

wherein the method further comprises: (e) the shift register generating a plurality of voltages forming one of the logic signals by regularly shifting the first signal.

* * * * *